United States Patent
Vreede et al.

(10) Patent No.: US 6,598,442 B1
(45) Date of Patent: Jul. 29, 2003

(54) PRODUCTION OF A COMPONENT FOR REDUCING THE EFFECTS OF AN EXTERNAL MECHANICAL IMPACT, AND THE COMPONENT PRODUCED IN THIS WAY

(75) Inventors: Peter Theodoor Vreede, Heemskerk (NL); Laurentius Cornelius De Winter, Hillegom (NL)

(73) Assignee: Corus Technology BV, IJmuiden (NL)

( * ) Notice: Subject to any disclaimer, the term of this patent is extended or adjusted under 35 U.S.C. 154(b) by 0 days.

(21) Appl. No.: 09/530,874

(22) PCT Filed: Nov. 18, 1998

(86) PCT No.: PCT/EP98/07541
§ 371 (c)(1),
(2), (4) Date: Jun. 30, 2000

(87) PCT Pub. No.: WO99/25991
PCT Pub. Date: May 27, 1999

(30) Foreign Application Priority Data

Nov. 19, 1997 (NL) .............................................. 1007580

(51) Int. Cl.⁷ .......................... B21D 26/02; B21D 51/12
(52) U.S. Cl. ................................... 72/58; 72/59; 72/62
(58) Field of Search ............................... 72/58, 59, 61, 72/62

(56) References Cited

U.S. PATENT DOCUMENTS

| 3,599,757 A | 8/1971 | Takamatsu et al. |
| 5,224,574 A | 7/1993 | Thum |

FOREIGN PATENT DOCUMENTS

| DE | 4316164 | 11/1994 | |
| DE | 19537206 | 4/1997 | |
| EP | 0548859 | 6/1993 | |
| EP | 0793035 | 9/1997 | |
| SU | 1433524 | * 10/1988 | .................... 72/58 |

* cited by examiner

Primary Examiner—David Jones
(74) Attorney, Agent, or Firm—Stevens, Davis, Miller & Mosher, LLP

(57) ABSTRACT

A process for producing a component for reducing the effect of an external mechanical impact, of the type which comprises an essentially tubular metal element which has a jump in its cross section which is such that under the influence of an axial load it can be turned at least partially inside-out as a result of plastic deformation, by means of which process the tubular element is formed by hydroforming from a piece of tube which has a cross section which is constant along its length, during which process part of the length of the cross section is increased in size, and the transitions in the cross section cover a short distance, and during the hydroforming an axial pressure on the piece of tube which is being deformed is set to be such that the transitions in cross section adapt to an S-shape.

8 Claims, 1 Drawing Sheet

PRODUCTION OF A COMPONENT FOR REDUCING THE EFFECTS OF AN EXTERNAL MECHANICAL IMPACT, AND THE COMPONENT PRODUCED IN THIS WAY

FIELD OF THE INVENTION

The invention relates firstly to a process for producing a component for reducing the effect of an external mechanical impact, of the type which comprises an essentially tubular metal element which has a jump in its cross section which is such that under the influence of an axial load it can be turned at least partially inside-out as a result of plastic deformation. The invention also relates to components produced in this way.

BACKGROUND OF THE INVENTION

There is a general need in the engineering sector for components which are able to reduce the effect of an external mechanical impact. A typical example is the automotive industry.

As traffic becomes ever heavier, many cars are subject to collisions, which may lead to considerable damage and harm to vehicles and people. For this reason, it is generally thought to provide these vehicles with components which are able to reduce the damage caused by collisions. It is generally known to protect the passenger compartment of the vehicle by means of so-called crumple zones at the front and rear of the vehicle. However, considerable material damage may still occur and can only be limited by absorbing part of the collision energy in or immediately next to the bumper. For this reason, considerable research has been devoted to the production of components which are coupled to the bumper and in which some of the collision energy can be dissipated as a result of plastic deformation of an element.

It should be noted, however, that the need for components for reducing the effect of an external mechanical impact is not limited to automotive engineering.

British Patent No. 884,953 describes a component for dissipating collision energy between the bumper and the chassis of an automobile, which component comprises a tubular element of the type described in the preamble. During a collision, the outside of a piece of tube is turned inwards, thus converting collision energy into energy required to achieve the plastic deformation of the tubular element.

It should be noted that the tubular element forms part of a component that is to be built into the overall structure of an automobile or of another mechanical structure, specifically in such a manner that the forces resulting from the external impact can be transmitted to and absorbed by the tubular element. This complete component is known to those skilled in the art by the term "crash unit". The tubular element which can be turned at least partially inside-out is also referred to in technical language by the term "invertube" and the movement by which it is turned inside-out is also known as "inversion". These terms will be used in the following text.

It is generally desired to make crash units as lightweight as possible using inexpensive production methods. U.S. Pat. No. 3,599,757 describes how an "invertube" is formed in three steps. Firstly, a piece of tube is expanded by hydroforming. Then, a reinforcement ring is attached at the location of a transition which has been formed, after which this unit is deformed under axial pressure.

SUMMARY OF THE INVENTION

The object of the invention is therefore to provide a simple and inexpensive production method, by means of which the finished invertube can be produced in a single operation without using any auxiliary means.

The invention consists in the fact that the tubular element is formed by hydroforming from a piece of tube which has a cross section which is constant along its length, during which process part of the length of the cross section is increased in size, and the transitions in the cross section cover a short distance, and during the hydroforming an axial pressure on the piece of tube which is being deformed is set to be such that the transitions in cross section adopt an S-shape.

The technique of hydroforming is extensively described in the specialist literature and does not require any further explanation here.

It has been found that using this new production method a piece of tube can be formed into an invertube which is suitable for a crash unit in a single operation, at reduced cost and without employed additional means.

The shape of an invertube in which the transition is S-shaped in cross section is known from German Laid-Open Specification DE 4316164. This makes it easier to initiate the inversion of the invertube when it is subjected to axial load, with the result that a regular, desired deformation of the invertube is obtained.

It has now been found according to the invention that such a shape can also be obtained using the hydroforming technique as a result of setting an axial pressure on the piece of tube which is being deformed during hydroforming to be such that the transitions in cross section adopt an S-shape. It should be noted that normally, during hydroforming, the expanding tube nestles against die halves. However, it has been found that using a higher axial pressure makes it possible to shorten the deformed piece of tube axially, so that the transitions come away from the die and adopt an S-shape.

The tubular element formed has straight tube ends at its extremities. These can be clamped directly into attachment sleeves which respectively form part of the bumper and the chassis of the car. However, it is also possible, according to the invention, to provide the tubular element itself with attachment means so as to form a crash unit. Attachment means of this nature may comprise flanges formed by turning down the ends of the element.

The most simple shape which can be obtained by hydroforming is a double invertube, which is in fact two invertubes which follow one another.

If a single invertube of the type described, for example, in the above mentioned German Laid-Open Specification is preferred, such a tubular element can be produced by cutting through the piece of tube which has been deformed by hydroforming halfway along its length.

In addition to the process described, the invention also relates to a component which is suitable for reducing the effect of an external mechanical impact, of the type which comprises an essentially tubular metal element which has a jump in its cross section which is such that, under the influence of an axial load, it can be turned at least partially inside-out as a result of plastic deformation the transitions in cross section of the tubular element being S-shaped. A component of this nature may then be obtained by using the process described above.

In order to incorporate the tubular element to form a new embodiment of the component, this tubular element may be provided with attachment means. These attachment means may comprise flanges which are formed by turning down the ends of the element.

Furthermore, a new design of the crash unit according to the invention is formed by providing the tubular metal element with a plurality of transitions in cross section. Finally, according to the invention the new component may form a single unit with a longitudinal beam of a motor vehicle. If this longitudinal beam is also produced using the hydroforming technique from a tube, it is possible to produce the invertube in a single production step together with such a longitudinal beam.

BRIEF DESCRIPTION OF THE DRAWINGS

The invention will now be explained with reference to the description of a number of figures.

DETAILED DESCRIPTION OF THE PREFERRED EMBODIMENTS

Figure 1:
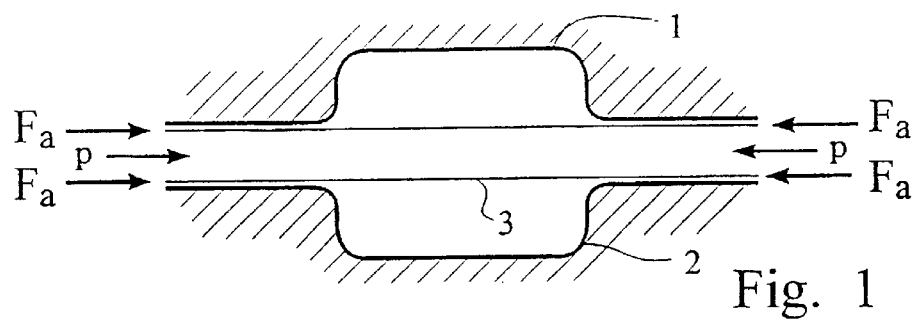
FIG. 1 diagrammatically shows how a tubular metal element is produced by means of hydroforming.

In FIG. 1, reference numerals 1 an 2 denote the mutually adjoining halves of a die used in the novel method. In the die, there is a piece of tube 3 which is being deformed by hydroforming to produce a tubular metal element (an invertube) for a crash unit. After hydraulic pressure has been applied inside tube 3, the tube wall begins to expand and become plastically deformed until it bears against the inner wall of the die halves 1 and 2. In order to avoid the tube material becoming excessively thin in certain locations, an axial pressure $F_a$ is applied to the ends of the tube, with the result that the ends of the tube are pressed inwards so as to ensure that a sufficient wall thickness is maintained in the expanded tube. In the case illustrated, the die is shaped in such a way that there are two sudden transitions in cross section. This leads to a tubular metal element 4 having the shape illustrated in FIG. 2. This element can be used as a double invertube in a crash unit. FIG. 3 shows how attachment sleeves 6 and 7 can be fixed to the undeformed ends of element 4, which sleeves respectively form part of a bumper structure of an automobile (not shown) and the chassis of this automobile (also not shown). If, in the event of a collision, the attachment sleeves 6 and 7 are moved towards one another, element 4 will be deformed as a double invertube, and specifically the ends of the invertube will be forced inwards at the location of the transitions 10.

Figures 4, 5:
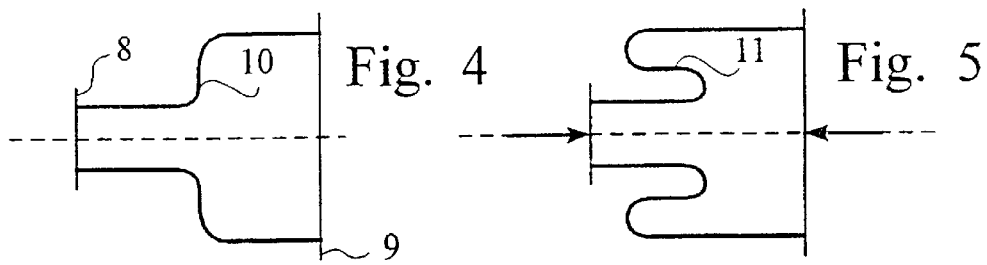
FIG. 4 shows a different design of a crash unit.
FIG. 5 shows a crash unit after an inversion.

FIG. 4 shows how a single invertube can be produced by cutting the element 4 (see FIG. 2) into two pieces halfway along, intersecting line 5. The open ends of the parts obtained in this way may, if desired, be formed into flanges 8 and 9 by turning down the edges. These flanges can then be used to incorporate the single invertube obtained in this way in a crash unit.

FIG. 5 diagrammatically depicts how this invertube shown in FIG. 4 is deformed after an axial force is exerted on the flanges 8 and 9. When this happens, the left-hand end of the tube is moved inwards towards the right-hand end around the transition 10.

Figure 6:
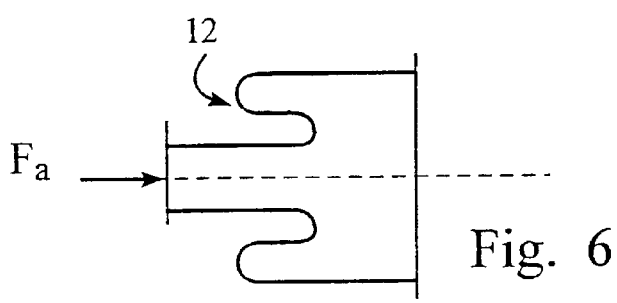
FIG. 6 shows yet another embodiment of a crash unit.

In order for the initial deformation of the invertube in accordance with FIG. 4 to proceed in an even more regular and reproducible manner, the transition 10 may be S-shaped (cf. reference numeral 12). This shape may be achieved by hot- or cold-forming of the finished product in accordance with FIG. 4 until it adopts the shape in accordance FIG. 6, but it has also been found that this shape can be obtained in a single operation during hydroforming. In the latter case, the axial $F_a$ must be increased towards the end of the process in which piece of tube 3 is hydroformed so as to produce element 4, with the result that the transition 10 adopts the S-shape in accordance with FIG. 6.

Figure 2:
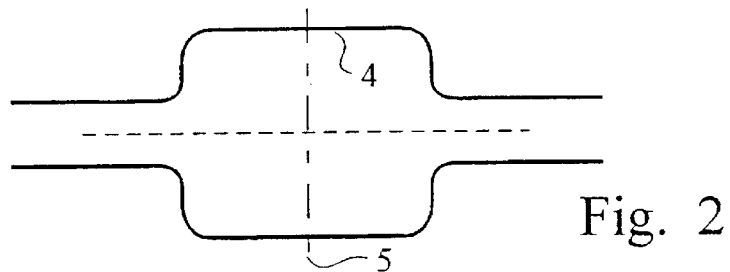
FIG. 2 shows a finished tubular metal element.
Figure 3:
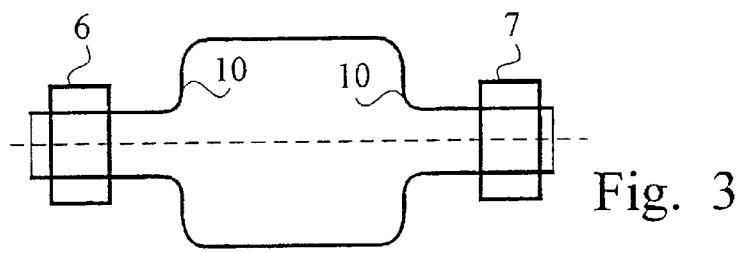
FIG. 3 shows a crash unit.

It should be noted that obviously it is also quite conceivable to produce the invertube in accordance with FIG. 2 with S-shape transitions 10 in the same way.

In many cases, in automobiles, the longitudinal beams of the chassis are also produced by hydroforming. In that case, it is possible to produce such a longitudinal beam and the metal element 4 as an invertube in a single production operation. Since this is a simple operation which does not require any further instructions to the persons skilled in the art, there is no need for a more detailed explanation of this variant with reference to a figure.

What is claimed is:

1. A process for producing a component for reducing the effect of an external mechanical impact, comprising an essentially tubular metal element comprising a jump in its cross section, such that under the influence of an axial load it can be turned at least partially inside out as a result of plastic deformation, and attachment means, the process comprising:

hydroforming a piece of tube which has a transverse cross section which is constant along its length; and during the hydroforming:

increasing in size, the transverse cross section of part of the length of the tube, such that the transitions between the parts of the tube not increased in cross section and the part of the tube increased in cross section cover a short distance, applying an axial pressure on the piece of tube which is being deformed such that the transitions in cross section adopt an S-shape, and forming the tubular element by cutting through the piece of tube which has been deformed by hydroforming halfway along its length.

2. The process according to claim 1, wherein the axial pressure is applied during later stages of hydroforming.

3. A process for producing a component for reducing the effect of an external mechanical impact, comprising an essentially tubular metal element comprising a jump in its transverse cross section, such that under the influence of an axial load it can be turned at least partially inside out as a result of plastic deformation, and attachment means, the process comprising:

hydroforming a piece of tube which has a transverse cross section which is constant along its length; and during the hydroforming:

increasing in size the transverse cross section of part of the length of the tube, such that the transitions between the parts of the tube not increased in cross section and the part of the tube increased in cross section cover a short distance, applying an axial pressure on the piece of tube which is being deformed such that at least one of the transitions in cross section adopts an S-shape, and forming the tubular element by cutting through the piece of tube which has been deformed by hydroforming halfway along its length.

4. A process for producing a component for reducing the effect of an external mechanical impact, comprising an essentially tubular metal element comprising a jump in its cross section, such that under the influence of an axial load it can be turned at least partially inside out as a result of plastic deformation, and attachment means, the process comprising:

hydroforming a piece of tube which has a transverse cross section which is constant along its length; and during the hydroforming:

increasing in size, the transverse cross section of part of the length of the tube, such that the transitions between the parts of the tube not increased in cross section and the part of the tube increased in cross section cover a short distance, and applying an axial pressure on the piece of tube which is being deformed such that the transitions in cross section adopt an S-shape, wherein at least one attachment sleeve is fixed to the piece of tube not having the increased cross section.

5. A component suitable for reducing the effect of an external mechanical impact, comprising:

an essentially tubular metal element comprising a jump in its cross section such that, under the influence of an axial load, the jump in cross section can be turned at least partially inside out as a result of plastic deformation, and attachment means, wherein the or each transition in cross section of the tubular element is S-shaped, wherein the essentially tubular metal element comprising the jump in its cross section is obtained by a process comprising:

hydroforming a piece of tube which has a transverse cross section which is constant along its length; and during the hydroforming:

increasing in size, the transverse cross section of part of the length of the tube, such that the transitions between the parts of the tube not increased in cross section and the part of the tube increased in cross section cover a short distance, and applying an axial pressure on the piece of tube which is being deformed such that the transitions in cross section adopt an S-shape;

wherein the attachment means comprises at least one attachment sleeve fixed to a section of the tubular metal element other than the section having the jump in its cross section.

6. The component according to claim 5, wherein the tubular element has a plurality of transitions in cross section.

7. A process for producing a component for reducing the effect of an external mechanical impact, comprising an essentially tubular metal element comprising a jump in its cross section, such that under the influence of an axial load it can be turned at least partially inside out as a result of plastic deformation, and attachment means, the process comprising:

hydroforming a piece of tube which has a transverse cross section which is constant along its length; and during the hydroforming:

increasing in size, the transverse cross section of part of the length of the tube, such that the transitions between the parts of the tube not increased in cross section and the part of the tube increased in cross section cover a short distance, applying an axial pressure on the piece of tube which is being deformed such that the transitions in cross section adopt an S-shape, and integrating the component with a longitudinal beam of a motor vehicle.

8. A unit comprising a component suitable for reducing the effect of an external mechanical impact, comprising:

an essentially tubular metal element comprising a jump in its cross section such that, under the influence of an axial load, the jump in cross section can be turned at least partially inside out as a result of plastic deformation, and attachment means, wherein the or each transition in cross section of the tubular element is S-shaped, wherein the essentially tubular metal element comprising the jump in its cross section is obtained by a process comprising:

hydroforming a piece of tube which has a transverse cross section which is constant along its length, and during the hydroforming:

increasing in size, the transverse cross section of part of the length of the tube, such that the transitions between the parts of the tube not increased in cross section and the part of the tube increased in cross section cover a short distance, and applying an axial pressure on the piece of tube which is being deformed such that the transitions in cross section adopt an S-shape;

a longitudinal beam of a motor vehicle.

* * * * *